W. C. TRUSSELL.
HAY RAKE AND COCKER.
APPLICATION FILED JULY 25, 1907.
924,297.
Patented June 8, 1909.
5 SHEETS—SHEET 1.
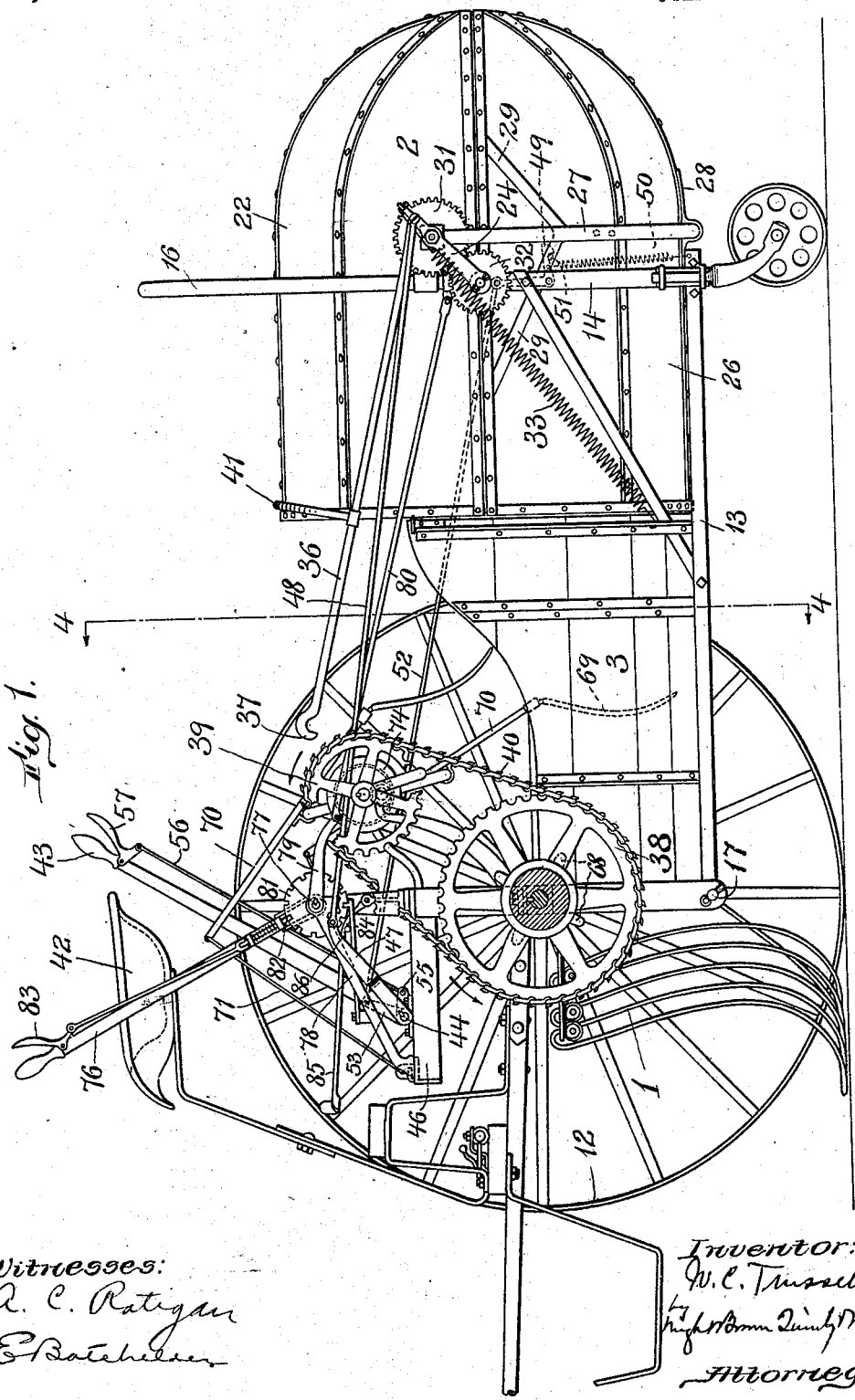

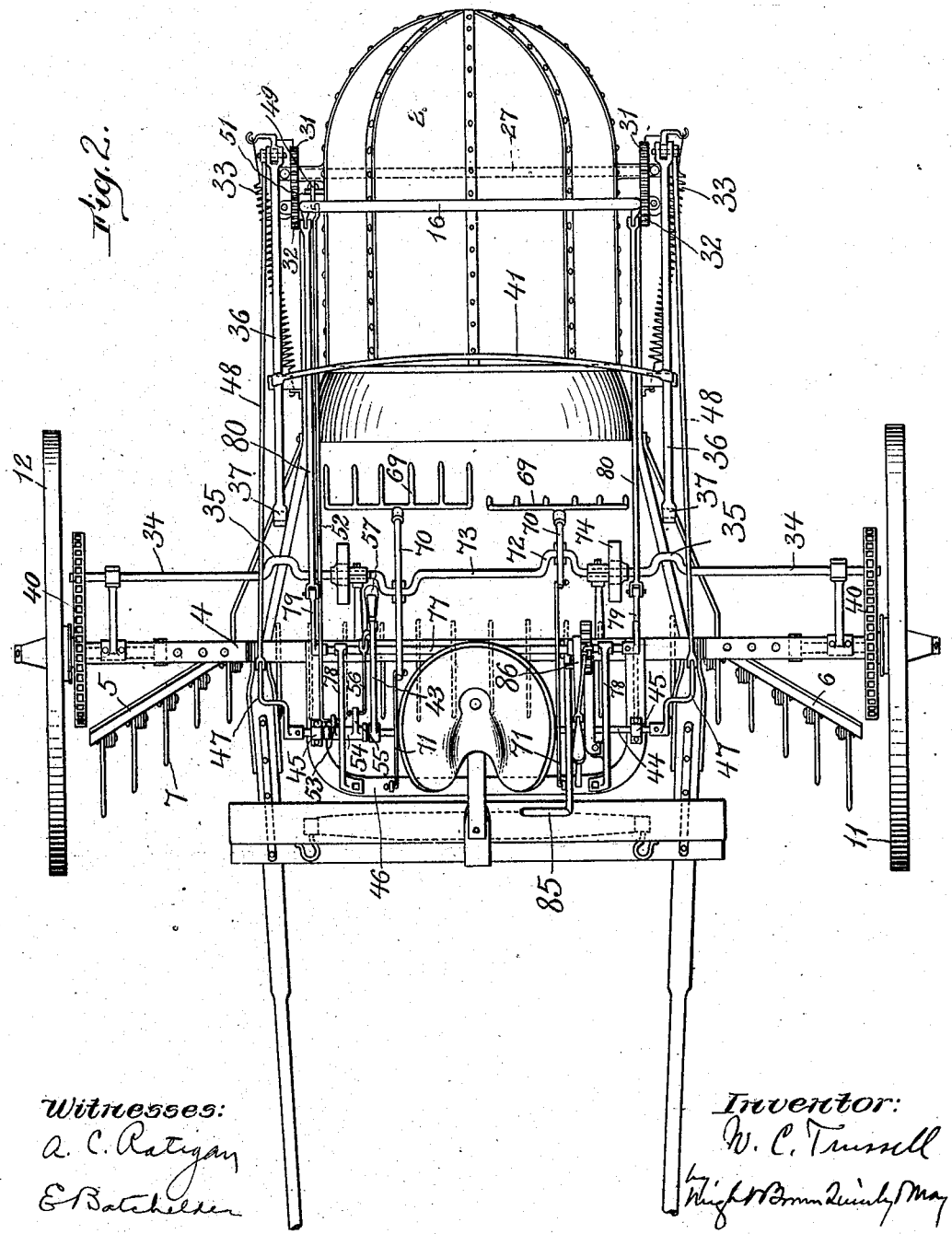

W. C. TRUSSELL.
HAY RAKE AND COCKER.
APPLICATION FILED JULY 25, 1907.
924,297.
Patented June 8, 1909.
5 SHEETS—SHEET 3.
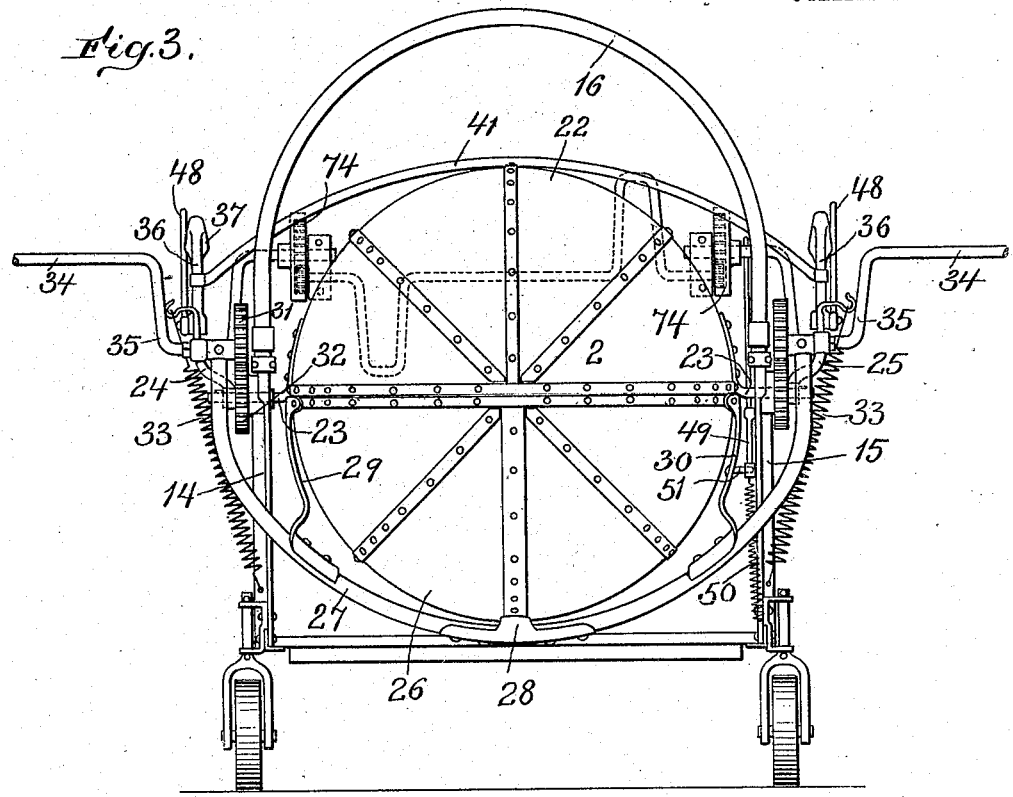
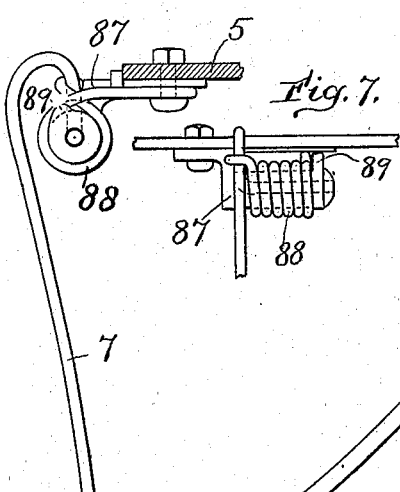
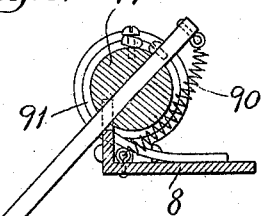
Witnesses:
a. C. Ratigan
E. Batchelder
Inventor:
W. C. Trussell
by Wright Brown Quinby May
Attorneys W. C. TRUSSELL.
HAY RAKE AND COCKER.
APPLICATION FILED JULY 25, 1907.
924,297.
Patented June 8, 1909.
5 SHEETS—SHEET 4.
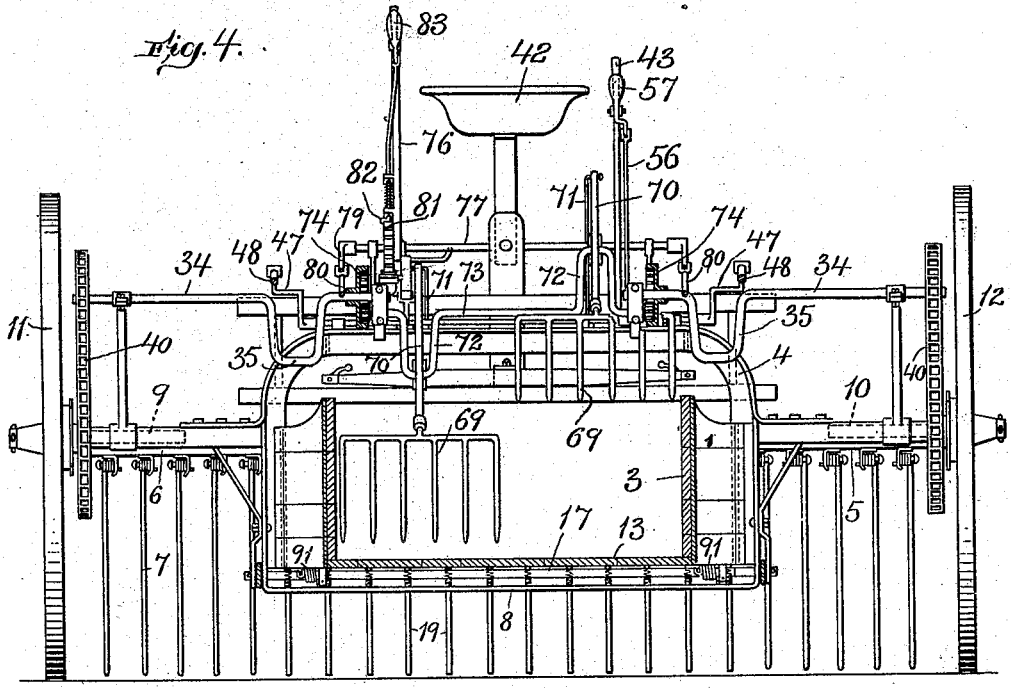
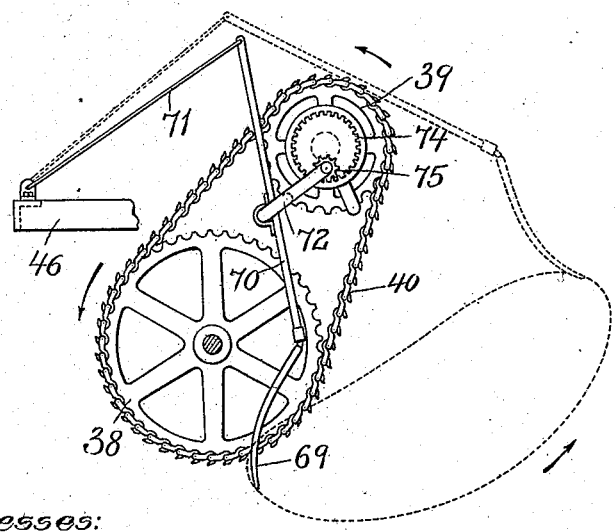
Witnesses:
A. C. Ratigan
E. Batchelder
Inventor:
W. C. Trussell
Attorneys.

W. C. TRUSSELL.
HAY RAKE AND COCKER.
APPLICATION FILED JULY 25, 1907.
924,297.
Patented June 8, 1909.
5 SHEETS—SHEET 5.
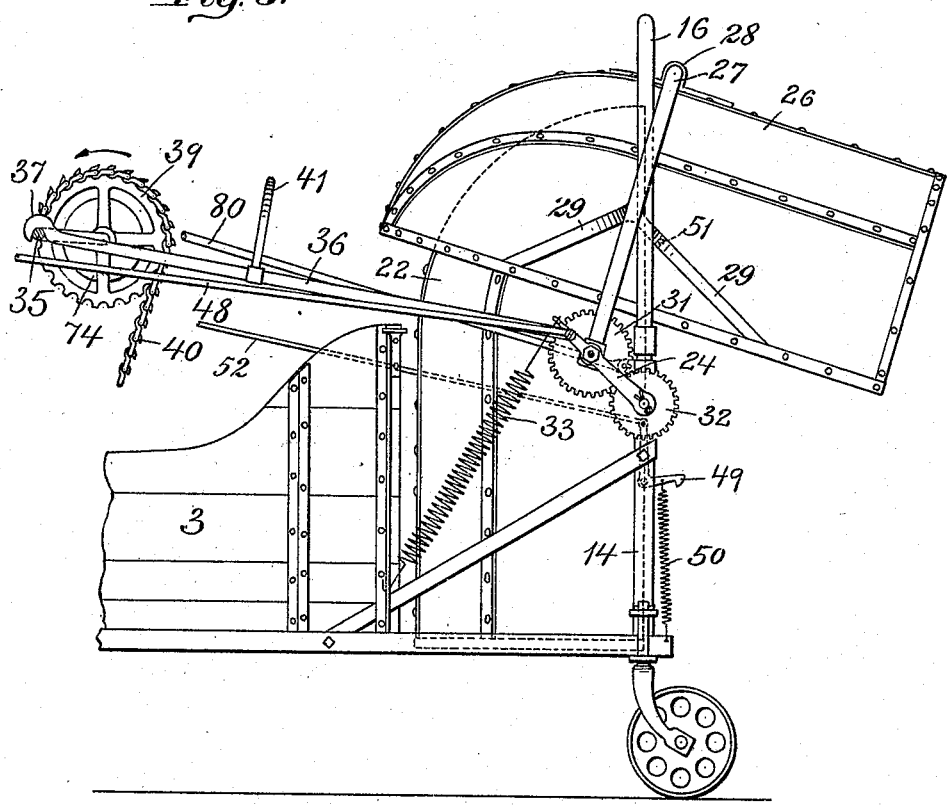
Fig. 5.
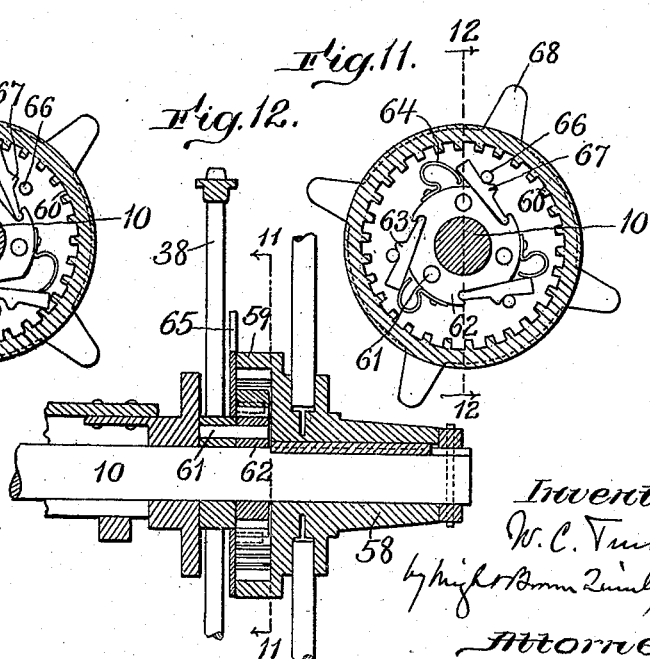
Fig. 10.   Fig. 11.   Fig. 12.
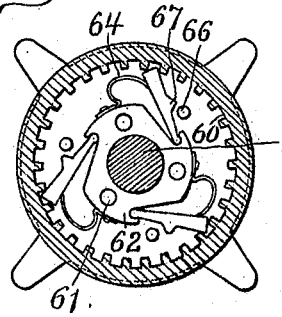
Witnesses:
Inventor:
W. C. Trussell
Attorneys.

UNITED STATES PATENT OFFICE.

WILBERT C. TRUSSELL, OF BOSTON, MASSACHUSETTS, ASSIGNOR TO TRUSSELL HAY HARVESTING MACHINERY COMPANY, OF BOSTON, MASSACHUSETTS, A CORPORATION OF MASSACHUSETTS.

HAY RAKE AND COCKER.

No. 924,297.　　　Specification of Letters Patent.　　　Patented June 8, 1909.

Application filed July 25, 1907. Serial No. 385,497.

*To all whom it may concern:*

Be it known that I, WILBERT C. TRUSSELL, of Boston, in the county of Suffolk and State of Massachusetts, have invented certain new and useful Improvements in Hay Rakes and Cockers, of which the following is a specification.

This invention relates to a machine for raking grass, hay or similar material from a field whereon it is spread, and gathering the same into a compact cock which can be deposited again upon the field at any point desired.

The object of the invention is to make a practical machine for this purpose which will be as simple in construction and as economical to build and operate as possible, and which will eliminate necessity for manual labor on the part of the operator, thereby insuring the maximum capacity and efficiency of the machine.

In carrying out my invention I have devised a machine of which the preferred embodiment is illustrated in the accompanying drawings, in which,—

Figure 1 represents a side elevation of the machine, showing all the parts except the nearest supporting wheel which has been removed for increased clearness. Fig. 2 represents a plan view of the machine. Fig. 3 represents a rear elevation. Fig. 4 represents a sectional rear elevation, showing the parts in front of the line 4—4 of Fig. 1. Fig. 5 represents a fragmentary elevation of the rear part of the machine, showing the cock former raised and opened for the purpose of dumping its contents. Fig. 6 represents a fragmentary detail elevation of one of the rake tines and the manner of mounting the same. Fig. 7 represents a front elevation of the parts shown in Fig. 6. Fig. 8 represents a sectional elevation of a tine used in a different part of the rake. Fig. 9 represents an elevation and diagrammatic view of the hay packer, the means for operating the same, and the manner in which it moves. Fig. 10 represents a sectional view of a form of clutch capable of being used in this machine for causing the supporting wheels to drive the operating parts. Fig. 11 represents a view similar to Fig. 10, showing the parts of the clutch in a different position, being taken on line 11—11 of Fig. 12. Fig. 12 represents a sectional detail view of one of the supporting wheels and the clutch, being taken on line 12—12 of Fig. 11.

The same reference characters indicate the same parts in all the figures.

The essential parts of the machine are similar to those illustrated and described in my prior patent granted February 19, 1907, and numbered 845,018, consisting of a rake 1 having a depressed central portion to form a discharge outlet, a cock former 2, and chute or guide 3 for leading the hay discharged from the rake rearward to the mouth of the former 2. The rake is formed on a frame consisting of a laterally extending bar 4 to which near the ends are connected the forwardly inclined bars 5 and 6 to which the longer rake tines 7 are connected and from the central portion of which is hung the bar 8 to form the depression in the rake permitting rearward discharge of the hay. The bar 4 extends continuously across the machine in order to give the necessary strength, and is raised at its central part so as to provide a large assage for the collected hay. In the ends of the transverse forward frame are contained axles 9 and 10 on which the main supporting wheels 11 and 12 are secured. The rear portion which carries the cock former and chute consists of a separate frame having a bottom platform 13 and uprights 14 and 15 connected by a bow 16. The front portion of the rear frame is pivotally connected by a transverse rod 17 with the depending portion of the forward frame. This rod carries the central shorter tines 19 of the rake.

In the present form of the invention the cock former is made in two parts which, when brought together, form a somewhat dome-shaped receptacle open at one end and normally held in a horizontal position with its open end forward and directly in rear of the chute 3. The division plane between the two parts of the former passes approximately through the axis and is horizontal when the former is in normal position. The upper portion 22 of the former is provided with trunnions 23 which are contained in bearings in the uprights 14 and 15 and to the ends of which are connected crank arms 24 and 25 by which the former may be rotated and by which the lower or separable part 26 of the former is carried. As seen in Figs. 1 and 3, the support for the lower portion of the former is a bow 27 of which the ends are secured to the arms 24 and 25 and which is united to the part 26 by a bottom strap 28 and lateral braces 29 and 30. Rigidly connected with the ends of the bow 27 are gears 31 which mesh with pinions 32 mounted concentrically with the trunnions 23 but secured fixedly to the uprights 14 and 15 so as to be incapable of any rotation whatever. On account of this arrangement of gearing, the parts of the former are caused to separate whenever the former is tilted from a horizontal to an upright position. Swinging of the arms 24 and 25 to the left, as seen in Fig. 1, simply turns the upper section of the former into a vertical position, but the gearing causes the lower section to have a further movement in the same direction. As the gears 31 are caused to roll about the pinions 32 by the movement of the arms which carry them, they are caused also to turn on their own axes, thereby giving a planetary motion to the lower section 26 and causing it to travel approximately twice as far as the upper section. Thereby the same motion which causes the former to be turned up as a whole also causes the rear section to be separated from the upper or forward section so as to offer no obstruction to the escape of the hay contained therein. The open or dumping position of the former is shown in Fig. 5. In order to balance the weight of the lower section of the former, I provide springs 33 which are connected to the arms 24 and 25, and also to fixed abutments. The direction of the springs is such that when the former is closed and in receiving position, they exert their force nearly through the pivotal axis of the former and produce practically no tendency to turn, but act with an increasing lever arm as the turning movement progresses.

In order to relieve the operator of all unnecessary labor, and to render the machine as nearly automatic as possible, I provide connections which cause the movement of the machine itself to tip the former and dump the cock so that none of this work need be done manually. To this end I mount a crank shaft 34 having crank arms 35 directly forward of the arms 24 and 25, while to the latter I pivot connecting rods 36. These rods are formed at their forward ends with hooks 37 adapted to hook over and catch the cranks 35, so that whenever they are so engaged and the crank shaft is rotated, the arms 24 and 25 will be automatically drawn forward and the cock former dumped.

The crank shaft is driven by the supporting wheel axles through sprockets 38 and 39 and chains 40 so as to turn continuously as long as the machine is in motion, whenever certain clutches, to be presently described, are thrown into gear. The connecting rods, however, are normally held out of the path of the cranks 35 by means of a hanger 41 which extends across between the connecting rods over the forward end of the former when the latter is in normal position, and is supported by such forward end. The hanger is disengaged from the cock former so as to allow the connecting rods to be engaged with the cranks by the manual action of the operator who gives a preliminary movement to the cock former which is just sufficient to depress its lower end and move forward the connecting rods and hanger enough to allow the latter to drop.

The operator being seated in the driver's seat 42, has near at hand a lever 43 which is secured to a rock shaft 44 mounted in bearings 45 on a forwardly projecting portion 46 of the front frame. From the ends of this rock shaft rise arms 47 to which are pivoted the ends of links 48 connected at their further ends with the arms 24 and 25. As will be readily understood, a forward swinging movement of the lever will tilt the cock former and at the same time move the connecting rods and hanger forward. As soon as the hanger has cleared the end of the former, the hooks 37 drop into the path of the cranks 35 and are engaged by the latter as soon as they approach. After this engagement takes place, the continued movement of the cranks swings the parts of the former through their full arc and then returns them to normal position. The last part of the return movement of the former is caused by its own weight, which is so distributed that the center of gravity comes in rear of the pivot when nearing horizontal position. Consequently, after the forward end of the cocker has risen under the hanger 41, its weight causes it to return fully into normal position, and in doing so, to lift the hooks from the cranks. After arriving in its normal position, the cocker is locked there by a latch 49 which is urged by a spring 50 to catch over a pin 51 carried by the cock former (see Figs. 1 and 3). This latch is connected through a link 52 with an arm 53 on a sleeve 54 (Fig. 2), said sleeve having a second arm 55 connected by a link 56 with a trigger 57 carried by the lever 43. Before operating the lever, the driver first moves the trigger toward the lever handle so as to turn the sleeve and release the latch from the pin 51. The cocker is then unlocked and subsequent forward movement of the lever is enabled to turn it through the preliminary movement for the purpose above described.

It is desirable not to have the rock shaft 34 continuously in motion, and for the purpose of causing this rotation to take place when desired, I provide disconnectible clutches between the supporting wheels and the sprockets 38. One of these clutches is shown in Figs. 10, 11 and 12. In these figures 58 represents the hub of one of the main wheels on which is formed a clutch member 59 having internal gear teeth 60. The sprocket wheel 38 is mounted loosely on the axle and carries connected to it by pins 61 a drum 62 which is located within the clutch member 59 and has notches in its periphery to receive dogs 63. Each of these dogs has a rounded end which fits into one of the notches and is pressed outward at its other end by a spring 64 so as to engage the teeth 60. Between the part 59 and ratchet wheel is a disk 65 having pins 66, one for each dog, which are so located as to be capable of engaging protuberances 67 on the dogs and crowding them against the pressure of the springs out of engagement with the teeth. This disk is mounted on the hub of the sprocket with sufficient frictional resistance to stay wherever it is placed, and moves with the latter and with the drum 62. It has peripheral teeth 68 whereby it may be turned so as to disengage the dogs from the clutch teeth or to allow them to become engaged.

For the purpose of transferring the hay rearwardly, and packing it into the cocker, I provide packers 69. There may be one, two or more of these packers, as desired, but in the present embodiment of the machine I have shown two. These packers are in the form of forks having handles 70 pivoted by means of links 71 to the forward part of the front frame so that the front ends of these fork handles may have a swinging movement. Intermediate their ends the packers are engaged by cranks 72 which are rotated by the movement of the machine, and cause the forks to travel in a circumferential orbit, such as shown in Fig. 9 by dotted lines. Each fork dips into the hay, forces it backward into the cocker, and then rises and moves forward again above the mass of hay. To accelerate the movement of the forks, I have formed the cranks 72 upon an intermediate rock shaft 73 contained between the ends of the rock shaft 34, which is divided so as to avoid interference with these cranks, and each section of which carries an internal gear 74. The secondary shaft 73 carries on its ends pinions 75 meshing with the internal gears, and is thereby turned at a much accelerated rate, as will be readily understood.

It is desirable to be able to tilt the forward frame so as to elevate the tines of the rake above the ground to avoid obstacles. To this end I have provided a lever 76 which is adapted to engage a rock shaft 77 mounted in brackets 78 which are secured to the upper part of the forward frame above the wheel axles. This rock shaft carries on its ends arms 79 which are connected by means of links 80 with the rear uprights 14 and 15. The connection between the lever 76, which is pivoted so as to turn loosely on the rock shaft and the arms, is made by a notched disk 81 secured to the shaft, which is engaged by a latch 82 on the lever and operated in the usual manner by a trigger 83.

When the latch is engaged with one of the notches and the lever 76 thrown forward or back, the arms 78 are moved out of line with the links 80 so as to shorten the distance between the rock shaft 77 and the rear part of the frame. The rock shaft 77 is then moved backward and the rod 17 which pivotally connects the front and back frames, is moved forward and upward. The front frame is thus tipped, and its lower part raised so as to lift the rake tines above the ground. The space between the bars 4 and 8 of the front frame is sufficiently deep to allow the chute to move forward so that a considerable range of movement is permitted, whereby the tines may be elevated as high as necessary under conditions which permit the use of a horse rake. The tines may be held in this elevated position by a spring latch 84 engaging the notches of the disk 81, said latch being secured to one of the brackets 78. A foot lever 85 is pivoted beside the latch and carries a pin 86 resting upon the same by which the latch may be disengaged whenever it is desired to lower the rake. When such release is effected, the parts return to normal position by the weight of the displaced portions of the forward frame.

One of the improvements of the present invention consists in the manner in which the tines of the rake are mounted so as to be sufficiently stiff to collect the hay, and at the same time yielding enough to give way when striking a rigid obstacle to avoid breakage. The longer tines are carried by brackets 87 secured to the bars 5 and 6. The ends of these tines are doubled back and bent laterally, being passed into and then longitudinally through the bracket, as shown most clearly in Fig. 7. A spring 88 is coiled about the bracket and is engaged at one end with the tine and at the other with the under side of the bracket, tending to throw the lower end of the tine forward as far as permitted before the spring abuts against a portion of the bracket. A lip 89 on the end of the bracket prevents the spring from slipping off the end thereof.

The intermediate short tines 19 are carried by the bar 17 and are inclined sharply forward. Each tine is engaged by a spring 90 which tends to project it forward, but allows it to be moved backward bodily whenever it strikes a rigid obstruction. Surrounding the bar 17 are springs 91 which bear against the lower transverse bar 8 of the main frame and retain the rod 17 and tines in proper angular position.

I claim:—

1. A machine for raking and cocking hay, comprising a rake having a discharge outlet, a cock former having an open end and including two sections, one of which is pivotally mounted in rear of the rake discharge outlet so as to swing from the normal position in which the open end is forward to that in which such end is lowermost, and the other of which sections is located so as to be at the rear of and above the first section when the open end thereof is downward, and connections operated by the movement of the machine for swinging the former as a whole and opening the separable section to release the hay.

2. A machine for raking and cocking hay, comprising a rake having a discharge outlet, a cock former having an open end and being pivotally mounted in rear of the rake outlet so as to swing between a normal horizontal position, in which its open end is forward, and a vertical position with its open end downward, a crank rotated by the movement of the machine, a connecting rod engaged with the cock former and normally disengaged from said crank but adapted to be connected therewith, and means for effecting the connection between the crank connecting rod, whereby to impart the described swinging movement to the former.

3. A machine for raking and cocking hay, comprising a rake having a discharge outlet, a cock former having an open end and being pivotally mounted in rear of the rake outlet so as to swing between a normal horizontal position, in which its open end is forward, and a vertical position with its open end downward, a crank rotated by the movement of the machine, an arm extending from the pivot of the former, and a connecting rod engaged with said arm and having a hook adapted to be connected with said crank at will, whereby the former may be automatically tilted to dump its contents.

4. A machine for raking and cocking hay, comprising a rake having a discharge outlet, a cock former having an open end and being pivotally mounted in rear of the rake outlet so as to swing between a normal horizontal position, in which its open end is forward, and a vertical position with its open end downward, a crank rotated by the movement of the machine, an arm extending from the pivot of the former, a connecting rod engaged with said arm and having a hook adapted to be connected with said crank, a hanger extending from said connecting rod over a portion of the former when the same is in normal position whereby the hook thereof is held out of the path of the crank, and manual means for disengaging the hanger from the former and allowing the connecting rod hook to fall into engagement with the crank, whereby the same is set into operation to oscillate the former.

5. A machine for raking and cocking hay, comprising a rake having a discharge outlet, a cock former normally in position to receive hay passing from said outlet and made of a plurality of separable parts, one of which is so mounted as to have a planetary movement about the other, whereby to dump the contents of the former.

6. A machine for raking and cocking hay, comprising a rake having a discharge outlet, a cock former normally in position to receive hay passing from said outlet and made of a plurality of separable parts, one of which is pivotally connected with the machine frame to tilt from receiving to discharging position, and the other of which parts is so mounted as to be capable of a further movement in the same direction, and means for so moving the said parts as to open the former at its rear and permit discharge of the hay.

7. A machine for raking and cocking hay, comprising a rake having a discharge outlet, a cock former normally in position to receive hay passing from said outlet and made of a plurality of separable parts, one of which is connected pivotally with the machine frame so as to swing from normal receiving position to discharging position, and means for swinging the other part simultaneously in the same direction with the first part but at a more rapid rate, whereby to open the former and release the hay.

8. A machine for raking and cocking hay, comprising a rake having a discharge outlet, a cock former connected to the frame of the machine in rear of the rake discharge outlet so that the open end thereof is normally forward and may be swung downward, said former consisting of two parts, one of which has pivots about which the former swings, gears fixed to the frame concentrically with said pivots, arms projecting from the pivots, and gears journaled on said arms secured to the other part of the former and meshing with the first-named gears, whereby an oscillating movement of said arms will tilt the first of said former parts, and give a planetary motion in the same direction to the other of said parts.

9. A machine for raking and cocking hay, comprising a rake having a discharge outlet, a cock former connected to the frame of the machine in rear of the rake discharge outlet so that the open end thereof is normally forward and may be swung downward, said former consisting of two parts, one of which has pivots about which the former swings, gears fixed to the frame concentrically with said pivots, arms projecting from the pivots, gears journaled on said arms secured to the other part of the former and meshing with the first-named gears, whereby an oscillative movement of said arms will tilt the first of said former parts and give a planetary motion in the same direction to the other of said parts, connecting rods attached to said arms, and cranks continuously rotated by the movement of the machine with which said connecting rods are adapted to be engaged to cause oscillation of the former parts.

10. A machine for raking and cocking hay, comprising a longitudinal frame, a rake at the forward end of the frame, supporting wheels at each side of the frame, a cock former at the rear end of the frame open at one end, adapted to lie normally horizontal with its open end toward the rake, and having its lower portion separable from the upper portion, pivots secured to said upper portion, arms secured to the pivots, connecting rods pivoted to said arms, cranks driven rotatably by the supporting wheels when the machine is in motion, hooks on the connecting rods adapted to engage said cranks, a hanger extending from one connecting rod to the other across the forward end of the former and supported thereby so as to hold the connecting rod hooks above the path of the cranks, and a manually-operated lever for throwing the connecting rods forward to release the hanger from the former and permit the hooks to be engaged with the cranks.

11. In a machine of the character described, a tilting cock former, manually-operated means for giving a preliminary tilting movement to the former, and connections becoming operative after such preliminary movement for causing the movement of the machine to tilt and open the former, causing its contents to be dumped, and return the former to normal position.

12. A hay rake and cocker comprising a frame, forward supporting wheels on said frame, rake tines carried by the frame, a cock former pivotally connected with the frame in rear of the rake, connecting rods for tilting the former to dump its contents, a rotary crank shaft having cranks adapted to be engaged by said connecting rods and through them to tilt the former, and a disconnectible clutch between the supporting wheel and crank shaft whereby the wheel may at will be caused to turn the shaft.

13. A machine for raking and cocking hay, comprising a forward frame, wheels supporting the lateral ends thereof, rake tines depending therefrom, a rear frame pivoted to the forward frame, a cock former mounted on the rear frame, and means connecting the frames, offset from the pivots thereof, for tilting the forward frame to raise the rake tines.

14. A machine for raking and cocking hay, comprising a forward frame, wheels supporting the lateral ends thereof, rake tines depending therefrom, a rear frame pivoted to the forward frame, a cock former mounted on the rear frame, an arm pivoted to the forward frame above the wheel axis, a link connected to the rear frame and to the said arm, and means for swinging said arm to swing the upper part of the forward frame to the rear and tilt the rake tines upward.

15. A machine for raking and cocking hay, comprising a forward frame, wheels supporting the lateral ends thereof, rake tines depending therefrom, a rear frame pivoted to the forward frame, a cock former mounted on the rear frame, an arm pivoted to the forward frame above the wheel axis, a link connected to the rear frame and to the said arm, and a lever engaged with said arm for swinging the same so as to tilt the forward frame and raise the rake tines.

16. A machine for raking and cocking hay, comprising a forward frame, wheels supporting the lateral ends thereof, rake tines depending therefrom, a rear frame pivoted to the forward frame, a cock former mounted on the rear frame, an arm pivoted to the forward frame above the wheel axis, a link connected to the rear frame and to the said arm, means for swinging said arm to swing the upper part of the forward frame to the rear and tilt the rake tines upward, a notched disk connected with said arm, and a tooth adapted to engage said disk and hold the frame in place.

17. A machine for raking and cocking hay, comprising a forward frame, wheels supporting the lateral ends thereof, rake tines depending therefrom, a rear frame pivoted to the forward frame, a cock former mounted on the rear frame, an arm pivoted to the forward frame above the wheel axis, a link connected to the rear frame and to the said arm, a notched disk connected to said arm, a hand lever concentric with said arm having a latch to engage the notches of the disk, through which the arm may be turned to tilt the forward frame and raise the tines, and a lock to engage the disk and hold the frame in any position.

In testimony whereof I have affixed my signature, in presence of two witnesses.

WILBERT C. TRUSSELL.

Witnesses:
ARTHUR H. BROWN,
P. W. PEZZETTI.